(12) United States Patent
Sagar

(10) Patent No.: US 7,689,446 B2
(45) Date of Patent: Mar. 30, 2010

(54) AUTOMATED RESERVATION SYSTEM WITH TRANSFER OF USER-PREFERENCES FROM HOME TO GUEST ACCOMMODATIONS

(75) Inventor: Rik Sagar, Santa Clara, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 2260 days.

(21) Appl. No.: 09/966,613

(22) Filed: Sep. 27, 2001

(65) Prior Publication Data

US 2003/0061077 A1 Mar. 27, 2003

(51) Int. Cl.
*G06Q 10/00* (2006.01)
*G05B 11/01* (2006.01)
(52) U.S. Cl. .................... 705/5; 705/1; 700/11
(58) Field of Classification Search .......... 705/1, 705/5–6; 700/11
See application file for complete search history.

(56) References Cited

U.S. PATENT DOCUMENTS

| | | | | |
|---|---|---|---|---|
| 4,899,373 A * | 2/1990 | Lee et al. | ............... | 379/201.05 |
| 6,834,208 B2 * | 12/2004 | Gonzales et al. | ............. | 700/86 |
| 2002/0073183 A1 * | 6/2002 | Yoon et al. | ................. | 709/220 |
| 2003/0023463 A1 * | 1/2003 | Dombroski et al. | ............ | 705/5 |
| 2003/0109938 A1 * | 6/2003 | Daum et al. | .................. | 700/11 |
| 2003/0149576 A1 * | 8/2003 | Sunyich | ........................ | 705/1 |

\* cited by examiner

*Primary Examiner*—John W Hayes
*Assistant Examiner*—Fadey S Jabr

(57) ABSTRACT

When a user reserves guest accommodations the user programmable settings of the appliances of the user's home network are transferred to the appliances of the guest accommodations. The settings can be stored in a file on the user's computer system or on an accessible external system such as the internet. Alternatively, or in addition, when the user makes a reservation, the home network can query appliances connected to the home network to determine the user programmable settings of such appliances.

25 Claims, 3 Drawing Sheets

AUTOMATED RESERVATION SYSTEM WITH TRANSFER OF USER-PREFERENCES FROM HOME TO GUEST ACCOMMODATIONS

FIELD OF THE INVENTION

The invention herein is related to the fields of information management and computer networking, and more specifically to the transfer of user preferences between devices.

BACKGROUND OF THE INVENTION

Many electronic consumer devices are user configurable so that the device conforms with the preferences of the user. Examples of such devices include speed dialing numbers on telephones, settings of personal computer software, push button tuning on radios, televisions and remote controls that operate such devices.

Recently, some devices store user preferences for multiple users of a device, so that when one of the users identified himself to the device, then the device loads a configuration file for the identified user.

Those skilled in the art are directed to U.S. Pat. No. 5,630,159 which describes methods for transferring user preferences between consumer electronic devices.

The above citations are hereby incorporated herein in whole by reference.

SUMMARY OF THE INVENTION

In the invention herein, an automated booking system for guest accommodations is used by a customer to reserve guest accommodations for the customer's use during a later period of time. The guest accommodations may be, for example, a hotel room with hotel facilities, a guest office with office facilities, a rental car package, an airline seat package, a restaurant table package, and a train seat package. The booking system transfers preferences of the customer from a home network of the customer, through an external network to the network of a provider of the guest accommodations. The home network of the customer may be a network of his residence or a network of his office. The external network may include one or more of a telephone network, a cable television network, an intranet, and the internet.

The preferences may include preferences entered by the customer into a data base of the home network prior to initiating the automated booking system. The preferences may also include automatically generated preferences. For example, user programmable settings of appliances connected to the customer's home network can be automatically determined by the home network and loaded into the data base before the time of transfer to the accommodations provider network. It would also be convenient if appliances connected to the home network had an option for uploading user programmable settings to the data base of the home network, so that, the user could easily control altering the settings of the data base.

Alternatively, the user programmable settings of the customer's appliances, connected to the home network, can be determined from the appliances at the time of transferring the settings from the customer's home network to the guest accommodation provider's network. In a combination of these methods, at the time of transmission, a data base of the home network containing user programmable settings of appliances is compared to the user programmable settings of the appliances connected to the home network and the user is queried to accept updates to the data base. It is contemplated that the preferences for a guest suite in a hotel would include uploading user programmable settings of multiple consumer electronic devices.

The customer may alter his preferences including the user programmable settings of the appliances in the guest accommodations after the period of use begins. Preferably, the system accommodates the transfer the updated preferences back from the guest accommodations through the external network to the data base of his home network for updating the settings of the appliances connected to his home network and/or for use during his next stay at guest accommodations.

At the time of booking, the customer's preferences are transferred from his home network and loaded into a data base of the accommodations provider and later accessed when the period of the customer's use commences. When the customer's preferences include user programmable settings of appliances, the user programmable settings are transferred from the data base of the provider's network into appliances of the guest accommodations so that the appliances are programmed with the user programmable settings of the customer. For appliances in the guest accommodations that are essentially the same as those of the customers home, the user preferences may merely be downloaded, for appliances that are only similar, an automatic conversion process will convert the user preferences of one device into user preferences of the similar device. When an appliance in the guest accommodations is substantially different than any in the customer's home network then a more complex conversion will be required. In this case the user preferences for several devices in the customer's home network may be used in combination to develop user preferences for the substantially different appliance.

The customer preferences may include preferences regarding the configuration of the guest accommodations such as size, arrangement, equipment, furnishings, sleeping accommodations or bathroom accommodations of the guest accommodations. The customer preferences may include the location of the guest accommodations with respect to other facilities of the guest accommodations or the locations of accommodations of other guests, such as, the floor on which a hotel room is located or the distance from the room to a guest swimming pool, or the position of a reserved seat on an airplane. The customer preferences may include service preferences such as airline snacks and meals, hotel breakfast preferences, brand of coffee or tea in a hotel room, or a preselection of a meal in a restaurant. For a hotel room, the preferences may include the contents of self-service food and drink bar in the room. For a guest office or a hotel room on a business trip, customer preferences may include preferred configuration of a personal computer, names of reference books, access to conference rooms, equipment for presentations such as projectors.

The user programmable settings may include speed dial settings of a telephone, fax machine, or speed dialer of a computer system. The user programmable settings may include environmental settings for environmental control systems such as temperature, humidity, and light level settings that may vary with the time of day or day of the week. The user programmable settings may include a channel map for translating between sources of video content and means for selecting between video content. This would allow, for example, setting the remote control of a hotel room so that the discovery channel was channel 4, and the weather channel was channel 6—the same as in the home network. Audio channel selections of an audio system of the guest accommodations could similarly be made to conform with the audio system of the customer's home network, so that for example, the same buttons on a remote control or on the face of the audio system in the guest accommodations, selected the same audio content (or at least similar audio content) as the customer's home network.

The user preference may include the software to be loaded on a personal computer or set-top-box of the guest accommodations to match the configuration of a computer in the customer's home. In addition, the user programmable settings of such software would match those on the customers home. Thus, the customer would be able to use the computer in the same way in guest accommodations as he used his computer in his home. The preferences may include preferences regarding settings of a security system, such as, a security code of a room alarm system and response to various sensors, such as, sound an alarm, activate a camera, or automatically call the front desk.

DETAILED DESCRIPTION OF PREFERRED EMBODIMENTS INCLUDING BEST MODE

Figure 1:
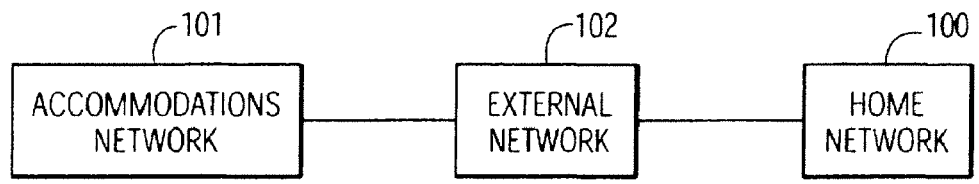
FIG. 1 illustrates the overall layout of an example automated reservation system of the invention with home network and guest accommodations network connected by an external network.

FIG. 1 shows a specific example of the invention in which a home network system 100 and a guest accommodations network system 101 are interconnected by an external network 102. Herein, a home network may be a system in the user's home, place of work, vehicle or community that interconnects various consumer appliances. Similarly, the guest network may be a system in guest accommodations such as a hotel room, guest office, airline seat, train cabin, rental vehicle, or other guest accommodations.

Figure 2:
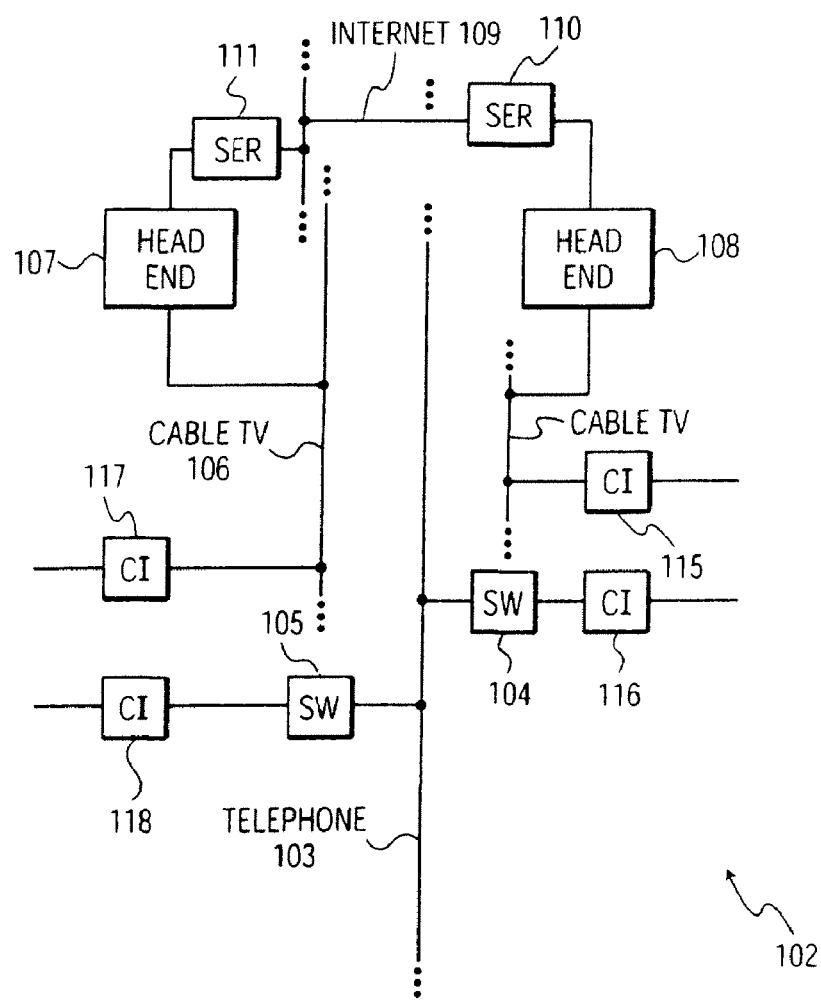
FIG. 2 illustrates an example embodiment of the external network of the system of FIG. 1.

FIG. 2 shows portions of an example external network 102 of FIG. 1. The external network may include a telephone network 103 with switches 104, 105 for routing data communication and/or may include a broadband network 106 with head ends 107, 108 for video data transmission (such as a cable television network). The external communication may also include an intranet and/or internet network 109 with servers 110, 111 for data communication. Various external networks for data communication are known in the art and can be utilized in the invention herein. Herein, data communication includes digital voice communication and computer data communication.

The external network is connected to the home network through customer interface units 115, 116 and connected to the guest accommodations network through customer interfaces 117, 118.

Figure 3:
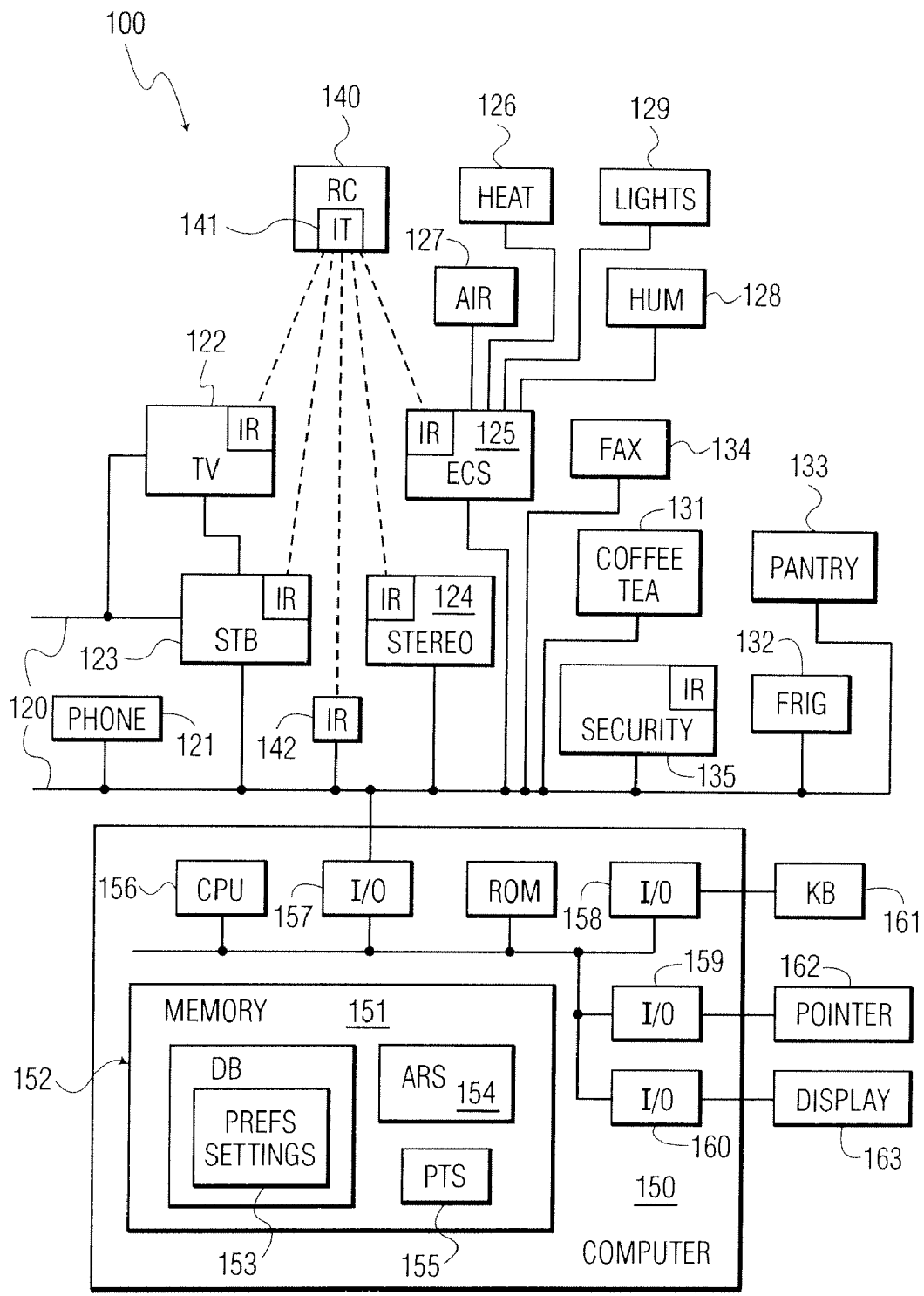
FIG. 3 illustrates an example of the home network of the system of FIG. 1 with consumer appliances connected to a home communication network.

FIG. 3 illustrates portions of the example home network 100 of FIG. 1. The home network includes multiple consumer electronic appliances connected to a home communications network 120. The connection may be by wiring, infrared, radio, or any other network media. The connected appliances may include, for example, a phone 121, with user programmed speed dial numbers, loudness settings, telephone credit card numbers, pin numbers and other passwords.

Home entertainment appliances may be connected to the home network to provide increased functionality and convenience. For example, television 122 may be connected to network 120 through set-top-box 123 as shown, or may be directly connected to network 120 without using a set-top-box, or the set-top-box and television may both be connected directly to the home network, and communicate through the network. Television 122 may have user defined buttons on the front panel of the television. Of course user programmable buttons may be on any surface of a electronic consumer appliance. The user can program the television to select user specified channels by pushing one or more of the user defined buttons on the front panel. Similarly, the television can be programmed to set the volume at a preselected volume level by just pressing another user defined button or combination of user defined buttons. Similarly, set-top-box 123 may be programmable so that user definable buttons on the front panel of the set-top-box select predefined user specified television channels or predefined user specified volume levels when the user presses one or more of the user defined buttons. Stereo 124 may be connected to the home communication network 120. The stereo may have user defined buttons on a front panel and be programmable so that a combination of one of more of the user defined buttons sets the stereo to receive in a predefined user specified frequency band (e.g. AM or FM) or to receive at a predefined user specified frequency or to set the state of a built in audio player (CD, DVD, cassette).

Environmental control system (ECS) 125 may be connected to the home communications network. The ECS controls heating system 126, air conditioning system 127, humidifier 128, and lighting system 129 within the home, office, or vehicle of the user. The system includes sensors for temperature, humidity, light levels and a clock. The ECS can be programmed to provide desired levels of temperature, humidity, and light depending on the time of day and the external environmental conditions.

Food and beverage equipment such as coffee or tea machine 131 may be connected to the home network and set to produce food at predetermined times. A refrigerator 132 may be connected to the home communication network and set to predetermined temperatures depending on the time of day or the contents of the refrigerator. The system can monitor the proper operation of the refrigerator and to keep an inventory of its contents so that as consumables are used they can be automatically ordered. Similarly, pantry system 133 can be connected to the home network to detect the consumption of supplies and automatically order replacements as the supplies are used.

Additional communication equipment such as a facsimile machine 134 may be connected to the home communication system for sending and receiving information. A security system 135 is attached to the home network to deter unauthorized entry and to warn the owner of such entry or the presence of fire or poisonous gases in the home.

A remote control 140 may be provided with infrared transmitter 141 to communicate with the equipment connected to the home network. The remote control can directly communicate with integral infrared receivers commonly provided with home appliances such as the set-top-box, television, stereo, ECS or security system. The home network may also allow remote control signals received by one appliance to be passed to another appliance to which it is addressed. Also, a separate infrared receiver 142 can be connected directly to the home communications network. The commands received by the separate infrared receiver 142 are transmitted to the applicable appliance or appliances.

The home network also includes a controller 150 to control the home network and for operating an automated reservation request portion of the automated booking system. The home controller may be a separate unit as shown or it may be included in one or more of the other home appliances such as the set-top-box. The controller includes a memory 151 containing a data base 152 for storing user preferences. The user preferences include programmed settings 153 of appliances connected to the home network. The controller also includes programming modules such as module 154 to provide the automated reservation request portion and module 155 for storing and retrieving information from the data base. The program modules control CPU 156 for processing information and to control input/output processors 157-160 to communicate with the home network communications network and computer peripherals such as keyboard 161, pointer device 162 and display 163.

Preferably, the controller can communicate with the appliances connected to the home network to determine the user programmable settings of the appliances either when an appliance is programmed or when an automated reservation is made. Generally, programmable consumer appliances have some type of menu interface that allows the user to directly program the appliance. Preferably, the home appliances may be programmed with user preferences through the home network connection. It may be more convenient to enter the user programmable settings of the consumer appliances through the controller because the user interface of the controller could be better (keyboard, mouse, large display) or more consistent than the interfaces of the consumer appliances. Thus, the controller can be used to set user programmable settings of the appliances, for example, when one of the appliances is replaced by a similar appliance or a new appliance is added. This allows user preferences to be transferred to the replacement appliance even if the replaced appliance no longer functions.

The home computer is also one of the appliances connected to the network which has user definable settings. These settings may include which programs that reside on the computer for the user's work or entertainment. The user's programs also include user programmable settings. The programs and their settings may be treated in a similar manner to other user programmable settings of the home network.

Figure 4:
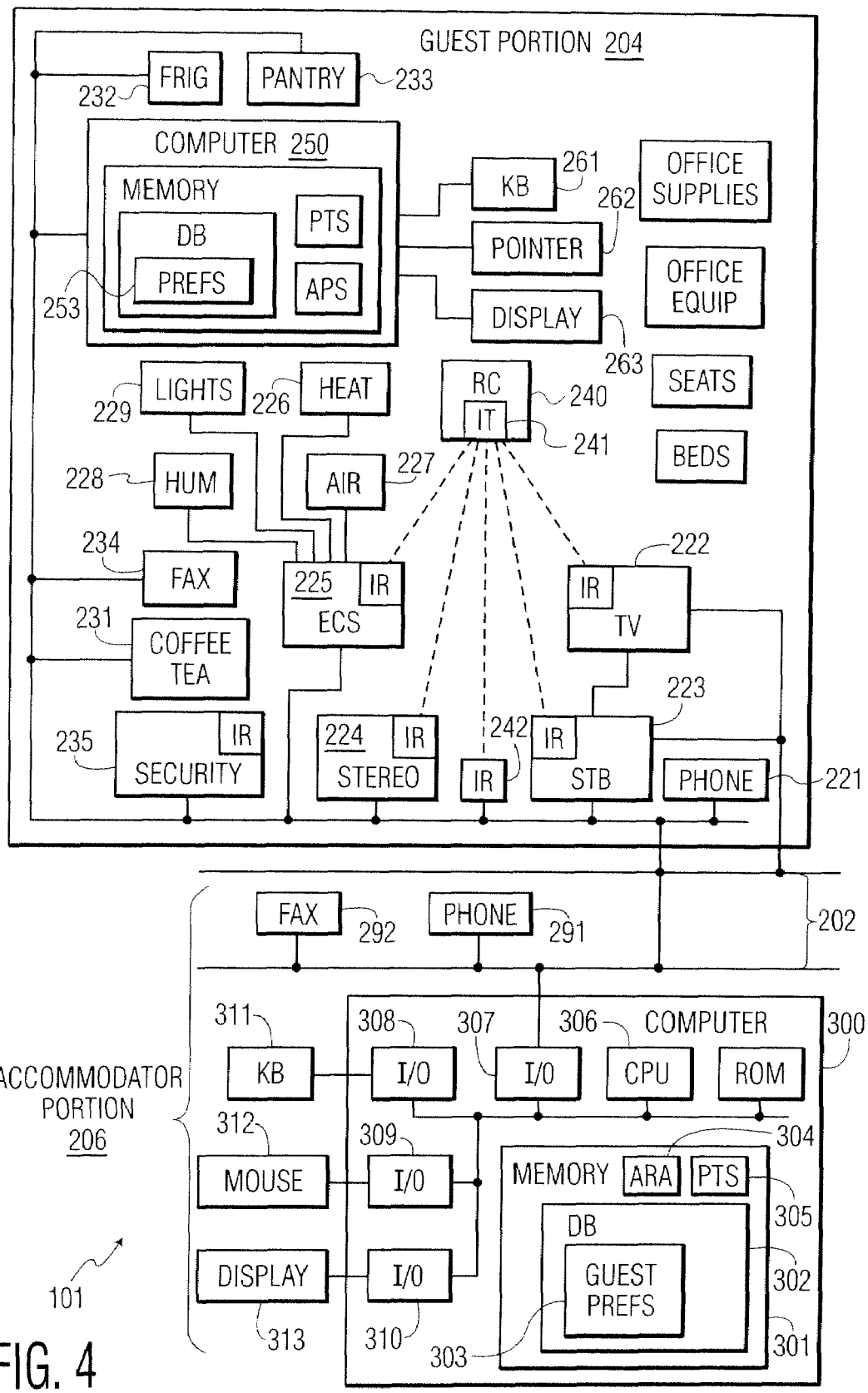
FIG. 4 illustrates an example of the guest accommodations network of the system of FIG. 1 with consumer appliances connected to the invention with a home network and a guest accommodations network interconnected by a guest communication network.

FIG. 4 illustrates portions of the example guest accommodations network 103 of FIG. 1. The guest accommodations network includes multiple consumer electronic appliances connected to a guest accommodations communications network 202. The connection may be by wiring, infrared, radio, or any other network media.

The guest accommodations network has two basic portions. First there is the guest portion 204 which the guest has exclusive use of. This portion may be similar to the home network of the guest. Second there is the accommodater portion 206. Some appliances of the accommodater portion may be used exclusively by the accommodations provider and other portions may be shared by multiple guests.

The appliances connected to the guest portion of the network may include, for example, a phone 221, with guest programmed speed dial numbers, loudness settings, telephone credit card numbers, pin numbers and other passwords. Home entertainment appliances may be connected to the guest portion to provide increased functionality and convenience. For example, television 222 may be connected to network 202 through set-top-box 223 as shown, or may be directly connected to network 202 without using a set-top-box, or the set-top-box and television may both be connected directly to the guest portion, and communicate through the network. Television 222 may have guest defined buttons on the front panel of the television. Of course guest programmable buttons may be on any surfaces of the connected electronic consumer appliances. The guest can program the television to select guest specified channels by pushing one or more of the guest defined buttons on the front panel. Similarly, the television can be programmed to set the volume at a preselected volume level by just pressing another guest defined button or combination of guest defined buttons. Similarly, set-top-box 223 may be programmable so that guest definable buttons on the front panel of the set-top-box select predefined guest specified television channels or predefined guest specified volume levels when the guest presses one or more of the guest defined buttons. Stereo 224 may be connected to network 202. The stereo may have guest defined buttons on a front panel and be programmable so that a combination of one of more of the guest defined buttons sets the stereo to receive in a predefined guest specified frequency band (e.g. AM or FM) or to receive at a predefined guest specified frequency or to set the state of a built in audio player (CD, DVD, cassette).

Environmental control system (ECS) 225 in the guest portion, may be connected to network 202. The ECS controls heating system 226, air conditioning system 227, humidifier 228, and lighting system 229 within the hotel room, guest office, airline seat, train cabin, rental vehicle or other accommodation space of the guest. The ECS system includes sensors for temperature, humidity, light levels and a clock. The ECS can be programmed to provide desired levels of temperature, humidity, and light depending on the time of day and the external environmental conditions.

Food and beverage equipment such as coffee or tea machine 231 may be connected to the guest portion of the guest accommodations network and set to produce food at predetermined times. A refrigerator 232 may be connected to network 202 and set to predetermined temperatures depending on the time of day or the contents of the refrigerator. The system can monitor the proper operation of the refrigerator and to keep an inventory of its contents so that as consumables are used they can be automatically ordered. Similarly, pantry system 233 can be connected to the guest portion to detect the consumption of supplies and automatically order replacements as the supplies are used.

Additional communication equipment such as a facsimile machine 234 may be connected to network 202 for sending and receiving information. A security system 235 is attached to the guest portion of the guest accommodations network 101 to deter unauthorized entry and to warn the owner of such entry or the presence of fire or poisonous gases in the guest accommodations.

A remote control 240 may be provided with infrared transmitter 241 to communicate with the equipment connected to the guest portion. The remote control can directly communicate with integral infrared receivers commonly provided with appliances such as the set-top-box, television, stereo, ECS or security system. The guest portion may also allow remote control signals received by one appliance to be passed to another appliance to which it is addressed. Also, a separate infrared receiver 242 can be connected directly to communications network 202. The commands received by the separate infrared receiver 242 are transmitted to the applicable appliance or appliances.

The guest accommodations may also includes a computer 250 for the guest's work or entertainment. The programs that are loaded on the computer are considered guest programmable settings along with the preferred settings of each of the programs. It may be more convenient to enter the guest programmable settings of the consumer appliances through the computer because the guest interface of the computer could be better (keyboard 261, mouse 262, large display 263) or more consistent than the interfaces of the individual consumer appliances. Thus, the computer can be used by the guest to set programmable settings of the appliances in the guest accommodations.

The user preferences for the guest portion may also include other aspects of the guest accommodations in addition to user programmable settings. For example, for a hotel room, the preferences may include the number or size of beds in a hotel room or the location of a hotel room. For an airline seat, the preferences may include the position of the seat or the choice of meals.

The appliances connected to the accommodater portion 206 may include any type of appliance connected to the guest portion 204. Preferably, the appliances connected to the accommodater portion include at least communications equipment such as a telephone 291 and a facsimile machine 292 for accepting reservations from potential guests.

The accommodater portion also preferably includes an accommodation controller 300 to control the guest accommodations network and to provide an automatic reservation accepting portion of the automated booking system. The accommodation controller may be a separate unit as shown or it may be included in one or more of the other appliances of the accommodater portion 206. The controller includes a memory 301 containing a data base 302 for storing guest preferences. The guest preferences include programmed settings 303 of appliances connected to the guest portion 204 of the guest accommodations network 101. The accommodation controller also includes programming modules such as module 304 to provide an automatic reservation accepting system and module 305 for storing and retrieving information from the data base. The program modules control CPU 306 for processing information and to control input/output processors 307-310 to communicate with the communications network 202 and to communicate with computer peripherals such as keyboard 311, pointer device 312 and display 313.

Prior to arrival of the guest in the guest accommodations, user preferences are transferred to the accommodation controller. The accommodations controller can communicate with the appliances connected to the guest portion 204 of the guest accommodations network 101 in order to initially set the guest programmable settings of the appliances when the occupation of the guest accommodations by the guest begins.

Generally, programmable consumer appliances in guest accommodations have some type of menu interface that allows the guest to directly modify the programmable settings of the appliances in the guest portion so that the guest can change the settings if desired. These modifications may be transmitted to the home network and be incorporated in the settings of the appliances of the home network. The transfer may in some cases be immediate and in other cases the transfer may occur later. For example, when the user enters a new speed dial number into a telephone or fax machine in the guest accommodation, then the number may be immediately transmitted to a similar appliance connected to his home network. On the other hand, other modifications to settings such as changes to the environmental system may result in transfer only at the end of the reservation period and may only be changed in the home network after confirmation by the guest.

The invention has been disclosed with reference to specific preferred embodiments, to enable those skilled in the art to make and use the invention, and to describe the best mode contemplated for carrying out the invention. Those skilled in the art may modify or add to these embodiments or provide other embodiments without departing from the spirit of the invention. Thus, the scope of the invention is only limited by the following claims:

The invention claimed is:

1. An automated booking system for guest accommodations, comprising:
   a guest accommodation which can be automatically booked by the system and used by a customer for a period of time;
   a provider network of a guest accommodations reservation provider having a data base for customer preferences;
   reserving means for communication between a home network and the provider network for reserving the guest accommodations for a period of use;
   preference transmission means for transmitting customer preferences from a data base of the home network to the data base of the provider network; and
   means for accessing the provider data base for providing the accommodations depending on the customer preferences, wherein the customer preferences include user programmable settings of home appliances in the home network.

2. The system of claim 1 in which the guest accommodations are selected from: a hotel room with hotel facilities, a guest office with office facilities, a rental car package, an airline seat packages, a restaurant table package, and a train seat package.

3. The system in claim 1 in which the customer preferences include the configuration of the guest accommodations.

4. The system of claim 1 in which the customer preferences include preferences regarding the location of the guest accommodations with respect to features of the accommodations or the locations of accommodations of other guests.

5. The system of claim 1 in which the customer preferences include user programmable settings of consumer appliances in the guest accommodations.

6. The system of claim 1 in which the customer preferences include preferred contents of a refrigerator in the guest accommodation.

7. The system of claim 1 in which the customer preferences include preferred food and food preparation equipment in the guest accommodations.

8. The system of claim 1 in which the customer preferences include meal preferences.

9. The system in claim 1 in which the customer preferences include preferred office equipment or supplies in the guest accommodations.

10. The system of claim 1 in which the customer preferences include preferred configuration of the personal computer available in the guest accommodations.

11. An automated booking system for guest accommodations, comprising:
    a home network of a customer, the home network interconnecting home appliances having user programmable settings;
    a guest accommodation which can be automatically booked by the system and used by the customer for a period of time and which can be provided with guest appliances;
    a provider network of an accommodations provider, the provider network having a data base, the guest appliances of the guest accommodations are connected to the provider network;

reservation means in communication with a home network of a customer and the provider network for reserving the guest accommodations for a period of use;

settings transmission means for transmitting the user programmable settings of the home appliances of the customer to the provider data base; and means for downloading the user programmable settings from the provider data base into the guest appliances of the guest accommodations for programming the appliances of the guest accommodations at the time of the customer's use of the accommodations.

12. The system of claim 11 in which settings for a plurality of the customer's home appliances are transmitted, stored and downloaded into corresponding appliances of the accommodations that have functions similar to the corresponding home appliances.

13. The system of claim 11 in which the settings of a plurality of the customer's home appliances are analyzed to determine user programmable settings for appliances that are different from the customer's home appliances.

14. The system of claim 11 in which the home network includes a data base containing the user programmable settings of devices connected to the home network.

15. The system of claim 14 in which the home network includes means for communicating with the appliances connected to the home network for automatically determining the current user programmable settings prior to transmitting the settings.

16. The system of claim 11 further comprising:
a data base of the home network;
means for uploading the user programmable settings from the customer's home appliances into the data base of the home network;
an external network communicating with the home network and the provider network;
the user programmable settings are transmitted from the data base of the home network to the data base of the provider network through the external network.

17. The system of claim 16 in which the external network includes one or more of: a cable television network, a telephone network, and the internet.

18. The system of claim 11 in which the programmable settings include speed dial settings for making telephone calls by pushing fewer buttons than the number of digits in corresponding phone numbers.

19. The system of claim 11 in which the programmable settings include speed dial settings for dialing to send facsimiles by pushing fewer buttons than the number of digits in corresponding facsimile telephone numbers.

20. The system of claim 11 in which the programmable settings include environmental settings selected from one or more of temperature, humidity, and light level settings.

21. The system of claim 11 in which the programmable settings include a channel map for translating between sources of multimedia programming and means for selecting multimedia programming.

22. The system of claim 21 in which the means for selecting programming includes a plurality of buttons on a remote control and channel map allows the customer in the hotel room to use the same series of one or more remote control buttons to select a desired programming source as the series of the buttons he uses in his home to select that source.

23. The system of claim 11 in which the programmable settings include settings of software of a personal computer of the hotel room.

24. The system of claim 11 in which the programmable settings include security settings including a security code of a room alarm system.

25. An automated booking system for guest accommodations, comprising:
a home network having a data base of customer preferences;
a guest accommodation which can be automatically booked by the system and used by the customer for a period of time;
a provider network of a guest accommodations reservation provider having a data base for customer preferences;
reserving means for communication between the home network and the provider network for reserving the guest accommodations for a period of use;
preference transmission means for transmitting customer preferences from the data base of the home network to the data base of the provider network; and
means for accessing the provider data base for providing the accommodations depending on the customer preferences, wherein the customer preferences include user programmable settings of home appliances in the home network.

* * * * *